US010870375B2

(12) United States Patent
Recktenwald

(10) Patent No.: US 10,870,375 B2
(45) Date of Patent: Dec. 22, 2020

(54) ADDITIVE COLLAPSIBLE SEAT

(71) Applicants: VOLKSWAGEN AKTIENGESELLSCHAFT, Wolfsburg (DE); PORSCHE AG, Stuttgart (DE)

(72) Inventor: Benedict A. Recktenwald, Sunnyvale, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/195,882

(22) Filed: Nov. 20, 2018

(65) Prior Publication Data

US 2020/0156517 A1 May 21, 2020

(51) Int. Cl.
| A47C 7/02 | (2006.01) |
| B60N 2/427 | (2006.01) |
| B60N 2/68 | (2006.01) |
| B33Y 80/00 | (2015.01) |
| B33Y 10/00 | (2015.01) |

(52) U.S. Cl.
CPC ..... B60N 2/42754 (2013.01); B60N 2/42745 (2013.01); B60N 2/42781 (2013.01); B60N 2/68 (2013.01); B33Y 10/00 (2014.12); B33Y 80/00 (2014.12); B60N 2205/30 (2013.01)

(58) Field of Classification Search
CPC .. B60N 2/7047; B60N 2/7052; B60N 2/7058; B60N 2/7094; B60N 2/3065; B60N 2/7064; B60N 2/7035; B60N 2/7076; B60N 2/36; B60N 2002/363

USPC ............ 297/452.48, 452.21, 452.35, 452.49, 297/452.54, 378.12, 334, 341, 452.64, 297/452.58, 284.1, 284.2
See application file for complete search history.

(56) References Cited

U.S. PATENT DOCUMENTS

| 2,048,126 | A | * | 7/1936 | Kuhner | ................ B60N 2/7035 |
| | | | | | 297/452.5 |
| 3,736,022 | A | * | 5/1973 | Radke | ...................... B60N 2/56 |
| | | | | | 297/452.43 |
| 5,002,336 | A | * | 3/1991 | Feher | ..................... A47C 7/744 |
| | | | | | 297/180.13 |
| 5,558,398 | A | * | 9/1996 | Santos | ..................... A47C 4/54 |
| | | | | | 297/284.3 |
| 7,909,403 | B2 | * | 3/2011 | Lawall | ................. B60N 2/4235 |
| | | | | | 297/284.9 |
| 8,939,510 | B2 | * | 1/2015 | Andersson | ........... B60N 2/7058 |
| | | | | | 297/334 |
| 9,145,073 | B2 | * | 9/2015 | Andersson | ........... B60N 2/3011 |
| 9,211,827 | B2 | * | 12/2015 | Michalak | ................. B60N 2/56 |
| 10,343,565 | B2 | * | 7/2019 | Baek | .................. B29D 99/0092 |
| 2006/0103214 | A1 | * | 5/2006 | Andersson | ........... B60N 2/7047 |
| | | | | | 297/378.13 |
| 2013/0088061 | A1 | * | 4/2013 | Andersson | ........... B60N 2/7058 |
| | | | | | 297/337 |

(Continued)

Primary Examiner — Chi Q Nguyen
(74) Attorney, Agent, or Firm — Barnes & Thornburg LLP

(57) ABSTRACT

Devices, systems, and methodologies for vehicle seats include selectively collapsible safety layers providing collapsible support to reduce impulse experienced by the seated passenger imparted by the vehicle seat, which can reduce the likelihood and/or extent of injury attributable to occurrences exceeding threshold momentum changes, such as transportation vehicle collisions.

22 Claims, 4 Drawing Sheets

(56) References Cited

U.S. PATENT DOCUMENTS

2017/0036578 A1 2/2017 White et al.
2020/0023757 A1* 1/2020 Line ...................... B60N 2/508

* cited by examiner

ADDITIVE COLLAPSIBLE SEAT

BACKGROUND

The present disclosure relates to systems, components, and methodologies for seats of vehicles. In particular, the present disclosure relates to systems, components, and methodologies for vehicle seats having safety aspects.

SUMMARY

According to one aspect of the present disclosure, portions of a transportation vehicle seat may be configured to improve safety of an occupant (passenger) positioned in the seat by reducing force applied to a passenger as a result of a vehicle collision. In some embodiments, the vehicle seat may include collapsible sections for reducing the impact load to a passenger's body under collision circumstances.

According to another aspect of the present disclosure, a vehicle seat for a transportation vehicle may include a frame for attachment with the transportation vehicle, a comfort section arranged for engagement with a user's body seated on the vehicle seat, the comfort section including a resilient cushion for compression under load of the user's body, and a means for providing collapsible support to the comfort section, wherein at least one precision safety section collapses at a predetermined change in momentum to enable at least a portion of a connection structure to penetrate at least one cavity to reduce impulse between the vehicle seat and the user's body.

In some embodiments, the means for providing collapsible support may include a safety matrix layer for providing collapsible support to the comfort section. The safety matrix layer may include an engagement platform connected with one of the frame and the comfort section, and a collapsible safety structure secured with the engagement platform. The collapsible safety structure may include at least one connection structure and at least one cavity. The at least one connection structure may be connected with the engagement platform and may include the at least one precision safety section for collapsing at the predetermined change in momentum to enable the at least a portion of the connection structure to penetrate the at least one cavity to reduce impulse between the vehicle seat and the user's body.

In some embodiments, the safety matrix layer may be arranged within a center section of a backrest of the vehicle seat. The vehicle seat may include a body having a base and the backrest extending vertically from the base. The comfort section may include a first section forming a portion of the base and a second section forming a portion of the backrest.

In some embodiments, the safety matrix layer may be arranged within an exterior trim layer such that collapse of the at least one precision safety section to penetrate the at least one cavity with at least a portion of the connection structure maintains the safety matrix layer within the exterior trim layer. In some embodiments, maintaining the safety matrix layer within the exterior trim layer may include maintaining the safety matrix layer within the exterior trim layer without protrusion of the safety matrix layer outside of the exterior trims layer.

In some embodiments, the at least one connection structure may be one of a network of connection structures included in the means for providing collapsible support. The network may be formed as an additive structure having a single integral member forming a plurality of connection structures of the network. In some embodiments, the network forms a lattice structure. The at least one cavity may be defined by space formed between adjacent portions of the lattice structure.

In some embodiments, collapsing the at least one precision safety section including at least one of deforming and breaking the at least one precision safety section. In some embodiments, the comfort section includes an exterior trim layer defining an outer portion of the vehicle seat for contact with the user.

According to another aspect of the present disclosure, a transportation vehicle may include a chassis, a body mounted to the chassis, a seat secured with the body for supporting a user in the seated position. The seat may include a frame for attachment with the body, and a comfort section arranged for engagement with a user's body seated on the vehicle seat. The comfort section may include a resilient cushion for compression under load of the user's body. The transportation vehicle may include a means for providing collapsible support to the comfort section, wherein at least one precision safety section collapses at a predetermined change in momentum to enable at least a portion of a connection structure to penetrate at least one cavity to reduce impulse between the vehicle seat and the user's body.

In some embodiments, the means for providing collapsible support may include a safety matrix layer for providing collapsible support to the comfort section. The safety matrix may include an engagement platform connected with one of the frame and the comfort section, and a collapsible safety structure secured with the engagement platform. The collapsible safety structure may include at least one connection structure and at least one cavity. The at least one connection structure may be connected with the engagement platform and may include the at least one precision safety section for collapsing at the predetermined change in momentum to enable the at least a portion of the connection structure to penetrate the at least one cavity to reduce impulse between the vehicle seat and the user's body.

In some embodiments, the safety matrix layer may be arranged within a center section of a backrest of the seat. The seat may include a seat body having a base and the backrest extending vertically from the base, wherein the comfort section includes a first section forming a portion of the base and a second section forming a portion of the backrest. In some embodiments, the comfort section may include an exterior trim layer defining an outer portion of the seat for contact with the user. The safety matrix layer may be arranged within the exterior trim layer such that collapse of the at least one precision safety section to penetrate the at least one cavity with at least a portion of the connection structure maintains the safety matrix layer within the exterior trim layer without protrusion outside of the exterior trims layer.

In some embodiments, the at least one connection structure may be one of a network of connection structures included in the means for providing collapsible support. The network may be formed as an additive structure having a single integral member forming a plurality of connection structures of the network. The network may form a lattice structure. The at least one cavity may be defined by space formed between adjacent portions of the lattice structure. In some embodiments, collapsing the at least one precision safety section may include at least one of deforming and breaking the at least one precision safety section.

According to another aspect of the present disclosure, a method of forming a vehicle seat may include forming a safety matrix layer for providing collapsible support, the safety matrix layer including an engagement platform and a collapsible safety structure secured with the engagement platform, and enclosing the safety matrix layer within an exterior trim. In some embodiments, the collapsible safety structure may collapse at a predetermined change in momentum to enable at least a portion of a connection structure to penetrate at least one cavity to reduce impulse between the vehicle seat and the user's body.

In some embodiments, forming a safety matrix layer may include additive manufacturing. In some embodiments, forming a safety matrix layer may include forming the collapsible safety structure by additive manufacturing.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Safety aspects in transportation vehicles can decrease the likelihood and/or extent of personal harm in vehicular incidents, such as collisions. However, incorporating safety aspects into transportation vehicle environments can present design challenges. Conforming safety aspects into existing architecture can assist in accommodating certain challenges.

Figure 1:
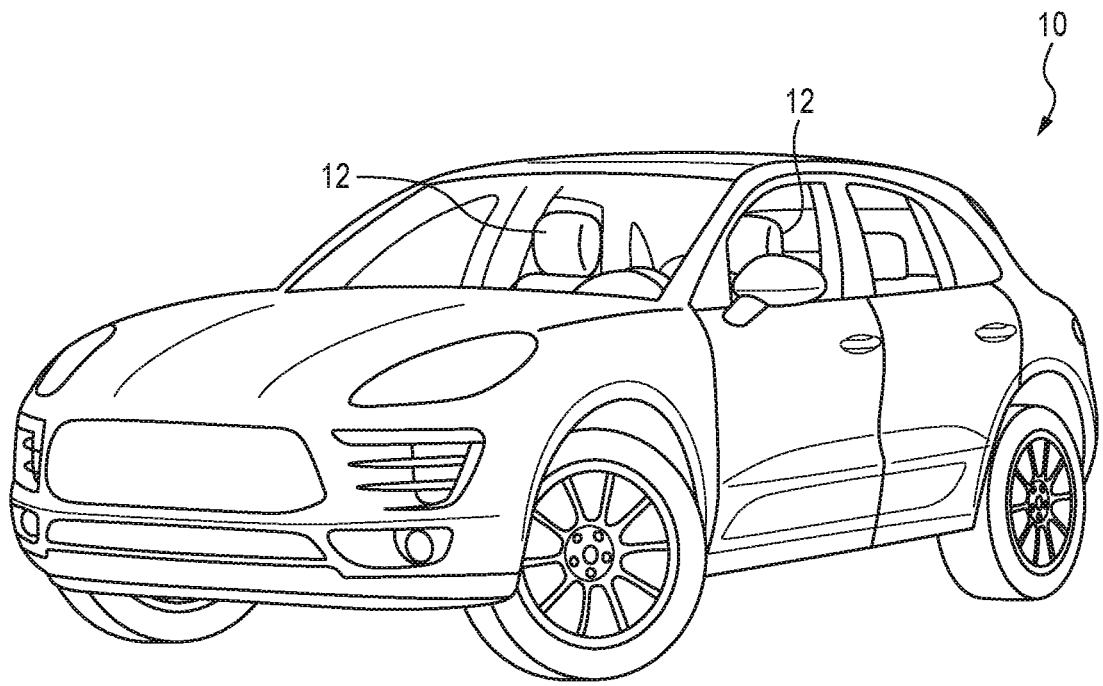
FIG. 1 is a perspective view of a transportation vehicle including a vehicle seat for supporting a user in the seated position.

Referring to FIG. 1, a transportation vehicle is shown as a typical passenger vehicle 10. In the illustrative embodiment, the vehicle 10 may have a gasoline combustion engine coupled by a drive train to drive the wheels as part of the chassis, but in some embodiments, may include any suitable drive configuration, such as those powered by alternative fuels and/or energy sources, hybrid-electric, full electric, etc. Vehicle seats 12 may be mounted within the transportation vehicle 10 to support seated passengers.

Figure 2:
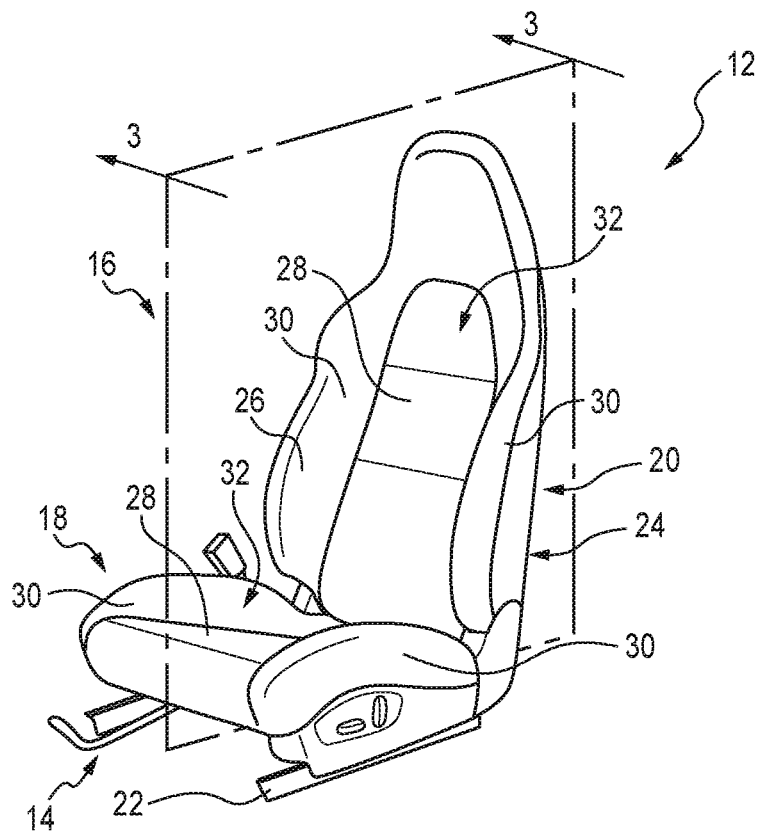
FIG. 2 is a perspective view of the vehicle seat of FIG. 1 showing that the vehicle seat includes a base and a backrest mounted on a frame for securing with the vehicle to support the seated user, and showing that the base and backrest include center sections and lateral sections formed to support the seated user's body.

As shown in FIG. 2, an exemplary vehicle seat 12 is shown in isolation. The vehicle seat 12 may include a frame 14 for securement to the chassis of the vehicle 10. The vehicle seat 12 may include a body 16 attached with the frame 14 to provide support to the seated passenger. Portions of the vehicle seat 12 may include collapsible sections for reducing the impact load to a passenger's body under collision circumstances, as discussed in additional detail herein.

The body 16 may include a seat base 18 for supporting a seated passenger's hindquarters and a backrest 20 extending from the seat base 18 to support a seat passenger's back. The frame 14 may include a seat section 22 supporting the seat base 18 and a back section 24 extending from the seat section 22 to support the backrest 20. The vehicle seat 12 may include a trim cover 26 as an exterior layer. The trim cover 26 may enclose the body 16, but not the frame 14, although in some embodiments the trim cover 26 may enclose some or all of the frame 14 (as represented in dashed line in FIG. 3).

The seat base 18 and backrest 20 may each include center section 28 and lateral sections 30. The center sections 28 may engage the primary portion of the passenger's body while the lateral sections 30 support the sides of the passenger's body. The collective center and lateral sections 28, 30 of the seat base 18 and backrest 20 may each form a shallow cavity 32 for receiving the passenger's body.

Figure 3:
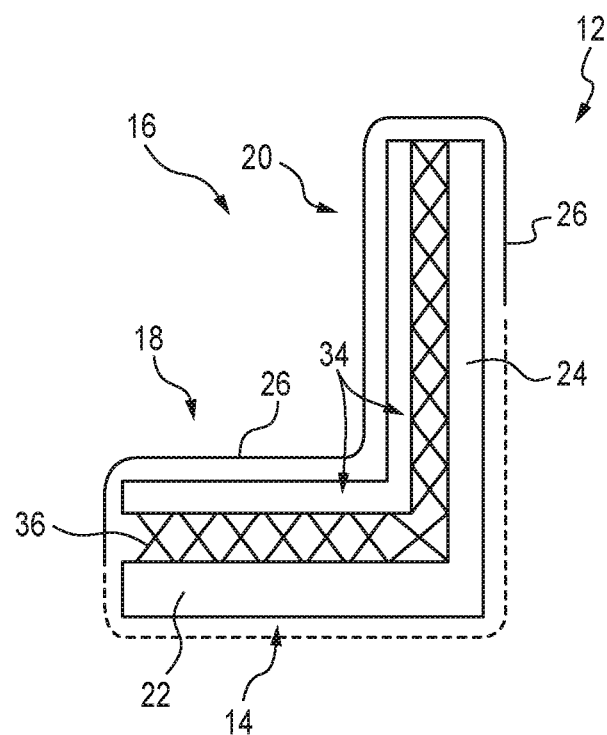
FIG. 3 is a diagrammatic cross-sectional view of the vehicle seat of FIG. 2 taken along the plane 3-3 of FIG. 2 showing that the vehicle seat includes a safety matrix layer disposed between the frame and a comfort layer to provide collapsible support to the comfort section such that under collapsing conditions of force to the vehicle seat a safety structure of the safety matric layer collapses to reduce the force between the vehicle seat and the user's body.

As shown in FIG. 3, a diagrammatic cross-section taken through the center sections 28 of the body 16 is shown. The vehicle seat 12 may include a comfort section 34 formed as a resilient layer for compression under the load of the passenger's body. The comfort section 34 may be embodied as one or more foam layers. The vehicle seat 12 may include a safety matrix section 36 for providing selective collapsible support to the comfort section 34 for reducing the impulse experienced by the passenger, for example, in the occurrence of a collision.

The safety matrix section 36 may be disposed between the comfort section 34 and the frame 14. Upon a predetermined change in momentum (impulse), such as that caused during a collision, one or more portions of the safety matrix section 36 may collapse to reduce the impulse experienced by the passenger from the vehicle seat 12. Accordingly, the risk and/or extent of injury to the passenger may be reduced.

Under selective collapse of a portion of the safety matrix section 36, the volume of the safety matrix section 36 is reduced to draw the corresponding portion of the comfort section 34 (and the trim cover 26) closer to the frame 14 as an inward collapse. Collapse of the safety matrix section 36 may provide a deeper cavity 32 depending on which portions are collapsed, for example, in embodiments comprising safety matrix section 36 only within the center sections 28, although in some embodiments, the lateral sections 30 may include a safety matrix section 36.

Figure 4:
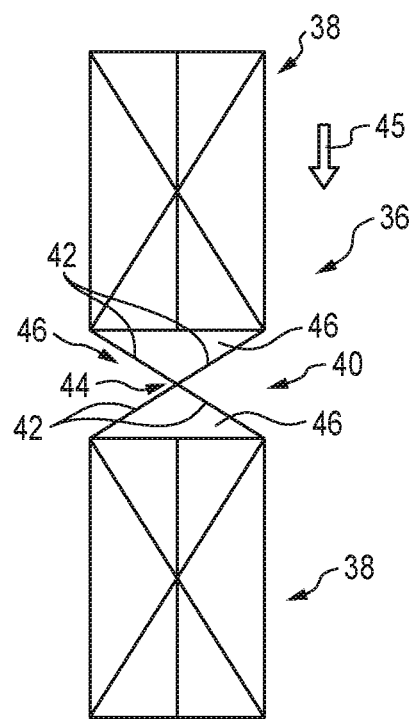
FIG. 4 is a diagrammatic view of a matrix structure of the safety matrix layer of the vehicle seat of FIG. 3 showing that the safety structure is connected with an engagement platform such that the engagement platform can be secured with the frame and/or the comfort layer of the vehicle seat.

Referring to FIG. 4, a diagrammatic view of a portion of the safety matrix section 36 is shown. The safety matrix section 36 may include an engagement platform 38. The engagement platform 38 can provide a mounting structure to engage the safety matrix section 36 with other portions of the vehicle seat 12, for example, with the frame 14. Another engagement platform 38 may be arranged opposite the initial engagement platform 38 for connection with the comfort section 34, although in some embodiments, the safety matrix section 36 may engage with the comfort section 34 without a dedicated engagement platform 38. The engagement platforms 38 may be formed as matrix structures, but in some embodiments, may be formed as generally solid structures.

The safety matrix section 36 may include a collapsible safety structure 40. The collapsible safety structure 40 may be secured with at least one of the engagement platforms 38 for engagement with the other portions of the vehicle seat 12. The collapsible safety structure 40 may include connection structures 42 for selective collapse.

The connection structures 42 may be formed as beams of a matrix forming a network to provide collapsible support. Although represented in a 2-dimensional space, the connection structures 42 may be embodied to form a 3-dimensional network. The connection structures 42 may include precision safety sections 44 arranged to collapse at a predetermined force level, for example, under a predetermined change in momentum resulting from a collision incident. The precision safety sections 44 may be embodied as structural connection points having particularly designed load failure characteristics at the predetermined change in momentum level. Arrow 45 represents the direct of load applied to the safety matrix section 36 under a sudden change in momentum, such as a collision.

The collapsible safety structure 40 may include cavities 46. The cavities 46 may be arranged amid the connection structures 42 to provide space to allow collapse of the connection structures 42 therein to reduce the volume of the safety matrix section 36 under collapse. The cavities 46 can permit containment of the collapsed connections structures 42 by intrusion of the connection structures 42 within the cavities 46 upon collapsing of the precision safety sections 44.

The collapsible safety structure 40 may include additive build, formed by additive manufacturing. Additive manufacturing processes such as 3-dimensional printing may be applied to build the connection structures 42 from a series of passes as an integral structure having the cavities 46 defined therein. In some embodiments, one or more of the engagement platforms 38 may be formed by additive manufacturing as integral with the connection structures 42.

Figure 5:
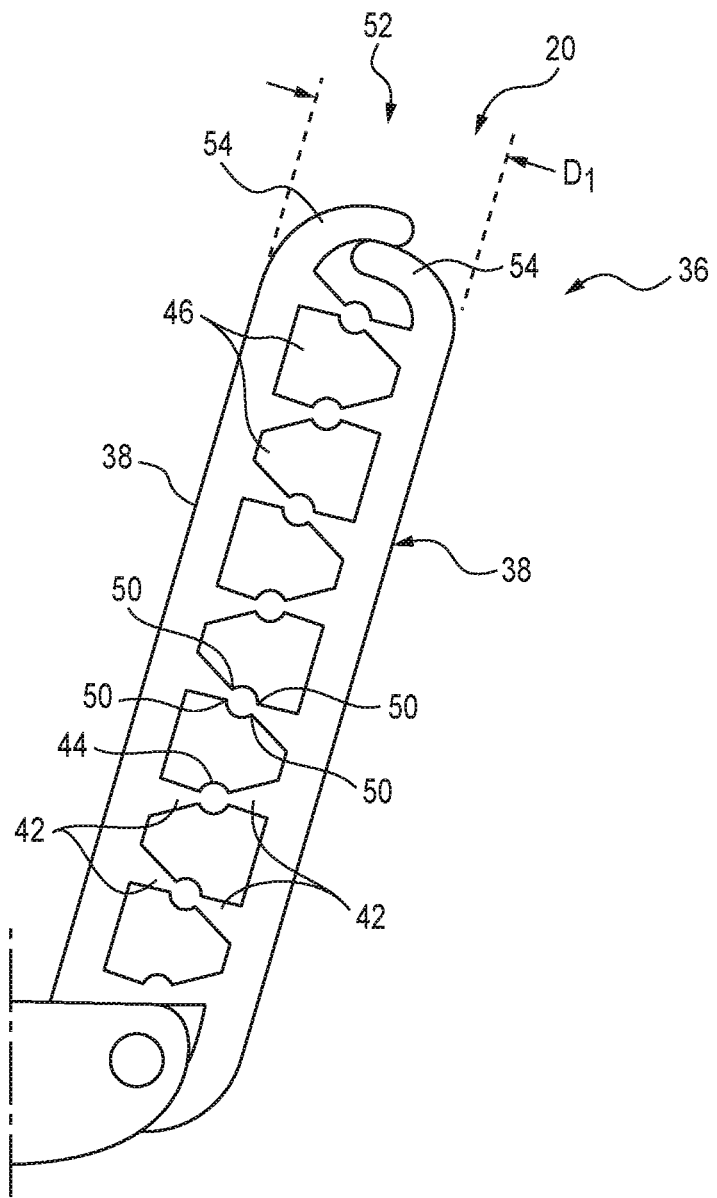
FIG. 5 is a cross-sectional view of the backrest of the vehicle seat of FIG. 2 taken along the plane 3-3 of FIG. 2 showing that the safety structure of the safety matrix layer includes connection structures having precision safety sections for collapsing at a predetermined force level and showing that cavities are arranged near the connection structures such that under collapsing of the precision safety structure a portion of the connection structures penetrates the cavity to reduce the volume of the safety matrix layer.

Referring now to FIG. 5, a cross-sectional view of the safety matrix section 36 is shown intact (uncollapsed) within the backrest 20, although the details of FIG. 5 may equally apply to the safety matrix section 36 within the base 18. The connection structures 42 of the collapsible safety structure 40 may extend from the engagement platforms 38 and may include the precision safety sections 44. The precision safety sections 44 may be embodied as bulbous portions 48 defining adjacent narrowed sections 50 designed for collapsing under the predetermined load forced. The cavities 46 may be defined between the adjacent connection structures 42.

An end connection 52 may be formed by overlapping connection structures 54. The end structure 52 can allow reduction in the volume of the safety matrix section 36 while avoiding collapsing that could penetrate out from within the vehicle seat 12.

Figure 6:
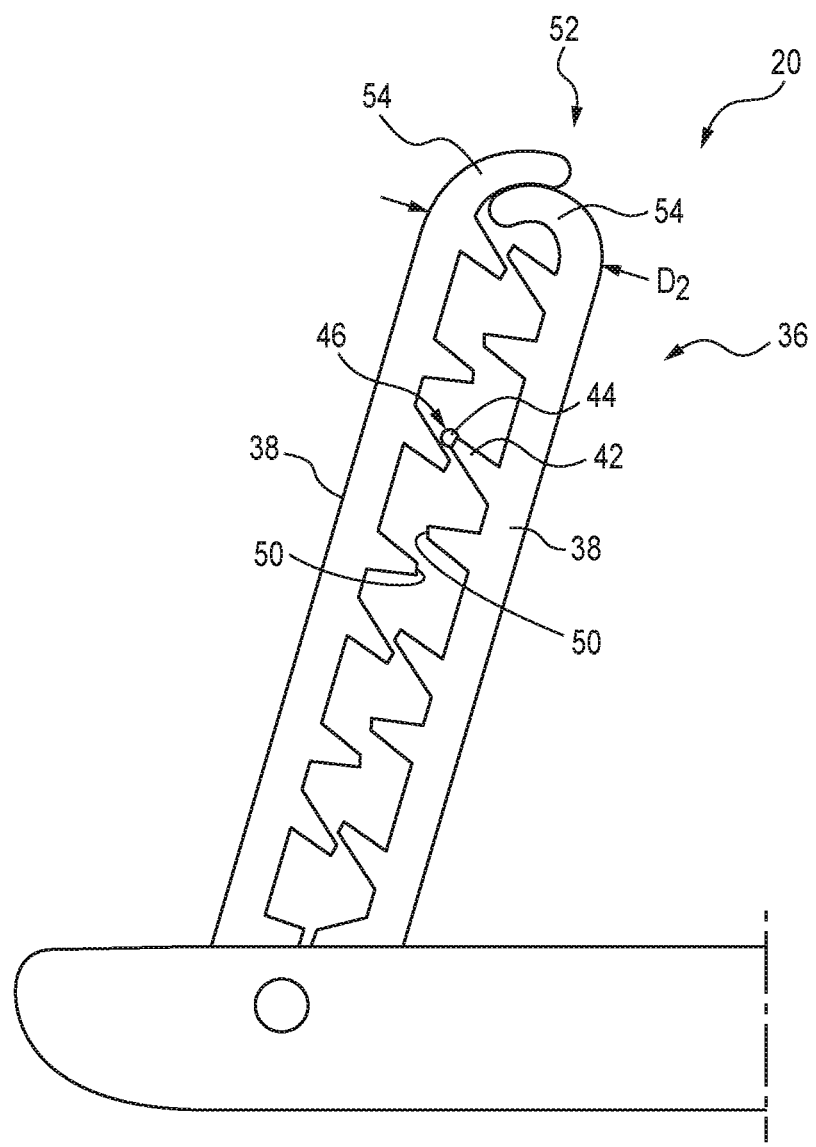
FIG. 6 is a cross-sectional view of the backrest of FIG. 5 showing that the safety structure of the safety matrix layer in a collapsed state in which the connection structures penetrate into the cavities but remain on the interior and to avoid protrusion outside of an exterior trim.

Referring now to FIG. 6, the safety matrix 36 is shown collapsed within the backrest 20. The precision safety sections 44 of each connection structure 44 are shown to be fracture at each narrowed section 50 thereof, although in some embodiments only one narrowed section 50 may fail. A portion of each connection structure is show penetrating into an adjacent cavity to allow reduction of the volume, illustratively lateral thickness, of the safety matrix section 36. Although in the illustrative embodiment of FIG. 6, each connection structure 44 is shown collapsed, in some instances, fewer than all of the connection structures 44 may collapse depending on the specifics, such as the extent of the change in momentum, the mass of the occupant, the position of the occupant, among others. With the end structure 52, the overlapping connection structures 54 may become additionally overlapped to accommodate the reduction in volume of the safety matrix section 36.

Notably, the collapsed connection structures 42 can remain within the interior of the vehicle seat 12. For example, in the embodiment as shown in FIG. 6, the connection structures 42 remain between the engagement platforms 38 to avoid projection outside of the vehicle seat 12 during collapse. Although the connection structures 42 are illustratively shown as collapsed including fracturing of the precision safety section 44, in some embodiments, collapse may include deformation of the connection structures 42 at the precision safety section 44 to penetrate the cavities 46 without fracturing, and/or with partial fracturing.

In comparison to FIG. 5, the collapsed safety matrix section 36 defines a thickness $D_2$ which is smaller than $D_1$ in the area of collapse. Accordingly, the volume of the safety matrix section 36 can be reduced under collapse. The risk and/or extent of injury to the passenger can be reduced as the impulse to the passenger is reduced.

The present disclosure includes devices, systems, and method of transfer of kinetic energy to the human body in vehicular crashes. Various methods may be applied to decelerate and/or reduce kinetic energy of a crash via crash zones around a vehicle, as well as to provide some minor reduction of velocity and/or kinetic energy from existing comfort layer like foam and cloth. With the increased availability of additive manufacturing, such as projection capable 3D printing, an enclosed seat structure with a solid base (structure mounted to the vehicle) and a solid contact area (structure that comes into engagement and/or contact with the human form), various methods using sheer sections, buckling beams, and collapsible lattice structures can be designed into the interior of the seat structure that are specifically designed to break, buckle, shear, and/or deform at a specific applied force and/or change in momentum onto the seat, thereby reducing the kinetic energy transfer of a crash to the occupant/human body.

In some embodiments, having sheer sections, buckling beams, and/or collapsible lattice structures enclosed between two complete structures can protect the occupant's body from parts that became sharp due to breakage and/or deformation, for example, the breakage and/or deformation required to reduce the forces applied during a crash. Designs within the present disclosure may reduce the weight of the seat structure, and/or provide a final layer of crash protection to the occupants. Such 3D printed seat structures for weight may include micro lattice structures to create super lightweight materials, implemented to include a designed failure point for collapse to absorb energy in the event of a crash.

The design of the present disclosure which includes 3D printing can allow for the ability to enclose a weaker structure into the core of a seat structure. Enclosing such a weaker structure can contain all the dangers from breakage within the seat as a near-field resort to the energy transfer problem in a crash. Threshold changes in momentum may be selected according to statistical analysis of collisions, or any other suitable means. In some embodiments, threshold impulse may be customizable based on the passenger's personal criteria.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

I claim:

1. A safety vehicle seat for a transportation vehicle comprising:
   a frame for attachment with the transportation vehicle;
   a comfort section arranged for engagement with a user's body seated on the vehicle seat, the comfort section including a resilient cushion for compression under load of the user's body; and
   a collapsible support that provides support to the comfort section, wherein the collapsible support includes at least one precision safety section configured for failure to permanently collapse in response to a predetermined change in momentum to enable at least a portion of a connection structure to penetrate at least one cavity to reduce impulse between the vehicle seat and the user's body under vehicular collision.

2. The vehicle seat of claim 1, wherein the collapsible support includes a safety matrix layer for providing collapsible support to the comfort section, the safety matrix layer including an engagement platform connected with one of the frame and the comfort section, and a collapsible safety structure secured with the engagement platform, the collapsible safety structure including at least one connection structure and at least one cavity, the at least one connection structure connected with the engagement platform and including the at least one precision safety section configured for failure to permanently collapse at the predetermined change in momentum to enable the at least a portion of the connection structure to penetrate the at least one cavity to reduce impulse between the vehicle seat and the user's body under vehicular collision.

3. The vehicle seat of claim 2, wherein the safety matrix layer is arranged within a center section of a backrest of the vehicle seat.

4. The vehicle seat of claim 3, wherein the vehicle seat includes a body having a base and the backrest extending vertically from the base, wherein the comfort section includes a first section forming a portion of the base and a second section forming a portion of the backrest.

5. The vehicle seat of claim 2, wherein the safety matrix layer is arranged within an exterior trim layer such that collapse of the at least one precision safety section to penetrate the at least one cavity with at least a portion of the connection structure maintains the safety matrix layer within the exterior trim layer without protrusion outside of the exterior trims layer.

6. The vehicle seat of claim 2, wherein the at least one connection structure is one of a network of connection structures included in the collapsible support.

7. The vehicle seat of claim 6, wherein the network is formed as an additive structure having a single integral member forming a plurality of connection structures of the network.

8. The vehicle seat of claim 6, wherein the network forms a lattice structure.

9. The vehicle seat of claim 8, wherein the at least one cavity is defined by space formed between adjacent portions of the lattice structure.

10. The vehicle seat of claim 2, wherein collapsing the at least one precision safety section includes at least one of deforming and breaking the at least one precision safety section.

11. The vehicle seat of claim 1, wherein the comfort section includes an exterior trim layer defining an outer portion of the vehicle seat for contact with the user.

12. A transportation vehicle comprising:
    a chassis;
    a body mounted to the chassis;
    a safety seat secured with the body for supporting a user in the seated position, the safety seat including a frame for attachment with the body, a comfort section arranged for engagement with a user's body seated on the vehicle seat, the comfort section including a resilient cushion for compression under load of the user's body and a collapsible support that provides support to the comfort section, wherein the collapsible support includes at least one precision safety section configured for failure to permanently collapse in response to a predetermined change in momentum to enable at least a portion of a connection structure to penetrate at least one cavity to reduce impulse between the vehicle seat and the user's body under vehicular collision.

13. The transportation vehicle of claim 12, wherein the collapsible support includes a safety matrix layer for providing collapsible support to the comfort section, the safety matrix including an engagement platform connected with one of the frame and the comfort section, and a collapsible safety structure secured with the engagement platform, the collapsible safety structure including at least one connection structure and at least one cavity, the at least one connection structure connected with the engagement platform and including the at least one precision safety section configured for failure by permanently collapsing at the predetermined change in momentum to enable the at least a portion of the connection structure to penetrate the at least one cavity to reduce impulse between the vehicle seat and the user's body under vehicular collision.

14. The transportation vehicle of claim 13, wherein the safety matrix layer is arranged within a center section of a backrest of the safety seat.

15. The transportation vehicle of claim 14, wherein the safety seat includes a seat body having a base and the backrest extending vertically from the base, wherein the comfort section includes a first section forming a portion of the base and a second section forming a portion of the backrest.

16. The transportation vehicle of claim 13, wherein the comfort section includes an exterior trim layer defining an outer portion of the safety seat for contact with the user.

17. The transportation vehicle of claim 13, wherein the safety matrix layer is arranged within the exterior trim layer such that collapse of the at least one precision safety section to penetrate the at least one cavity with at least a portion of the connection structure maintains the safety matrix layer within the exterior trim layer without protrusion outside of the exterior trims layer.

18. The transportation vehicle of claim 13, wherein the at least one connection structure is one of a network of connection structures included in the collapsible support.

19. The transportation vehicle of claim 18, wherein the network is formed as an additive structure having a single integral member forming a plurality of connection structures of the network.

20. The transportation vehicle of claim 18, wherein the network forms a lattice structure.

21. The transportation vehicle of claim 20, wherein the at least one cavity is defined by space formed between adjacent portions of the lattice structure.

22. The transportation vehicle of claim 13, wherein collapsing the at least one precision safety section includes at least one of deforming and breaking the at least one precision safety section.

\* \* \* \* \*